United States Patent Office 3,180,842
Patented Apr. 27, 1965

3,180,842
POLYMERIC COMPOUNDS CONTAINING NITROGEN
Robert Neville Haszeldine, Ronald Eric Banks, and William Thain Flowers, all of Manchester, England, assignors to National Research Development Corporation, London, England, a British company
No Drawing. Filed Nov. 15, 1961, Ser. No. 153,254
Claims priority, application Great Britain, Nov. 15, 1960, 39,173/60
7 Claims. (Cl. 260—2)

The present invention relates to polymeric organic compounds which contain nitrogen and carbon in the polymer chain.

The invention provides a new class of polymeric compounds having a linear chain of repeated —N—O—C— units and having the general formula $(-NR-O-CH_2-)_n$ of which R represents the group

R'R"CX— where R' and R" may be hydrogen, alkyl, aryl or halogeno-alkyl or halogeno-aryl groups or a nitrohalogenoalkyl group or fluorine or chlorine and X represents chlorine or fluorine.

The polymers may be prepared by reacting diazomethane with an appropriately substituted nitroso-compound R'R"CX—NO. The reaction proceeds readily at normal and sub-normal temperatures and is conveniently carried out by slowly adding the nitroso-compound to the diazo-methane in a solvent such as diethyl ether and evaporating the solution to leave the polymer.

For example, a polymer may be obtained by slowly passing about 2 parts of trifluoronitrosomethane into a solution of diazomethane (1 part) in diethyl ether (about 50 parts) at a temperature between about $+30°$ C. and $-100°$ C. The reaction takes place very rapidly and requires no catalysis. The ethereal solution is evaporated to leave the 1:1 copolymer $(-N.CF_3-O-CH_2-)_n$ The polymer is a white wax.

In general reaction temperatures in the range $-150°$ to $150°$ C. will be found suitable for the process of this invention but the preferred range is from $-100°$ to $25°$ C.

Solvents may be used provided that they have a low melting point, are good solvents for the diazo-compound; do not react with the nitroso-compound, and can be readily removed from the polymer.

Diethyl ether is a preferred solvent. Perfluoro-n-pentane and $CF_2Cl.CFCl_2$ may also be used. They are particularly useful with halogenoalkyl nitroso-compounds, for which they are good solvents. The resultant polymer is readily obtained from ethyl ether by evaporation of the solvent. The polymer tends to be insoluble in the halogenated solvents, which can be recovered in high yield because of their low boiling points ($C_5F_{12}$ 28°; $CF_2Cl.CFCl_2$ 46°). Formation of solid polymer, e.g., elastomer or resin is favoured by (i) Use of low temperatures;
(ii) Use of a solvent which has good solvent power for the polymer; and
(iii) Use of a relatively concentrated solution of the diazoalkane. All three factors tend to increase the molecular weight of the polymer.

An inert gas may be used to dilute the $CH_2N_2$ e.g. $N_2$, He, and so reduce the possibilities of explosion with undiluted diazomethane.

Various methods of bringing the reactants together are possible. Thus, the $CH_2N_2$ may be added to the nitroso-compound or its solution at subatmospheric pressure (<100 mm. Hg) or a stream of $CH_2N_2$ diluted with an inert gas may be passed into the nitroso-compound or its solution.

The nitroso-compound or its solution may alternatively be added to a solution of $CH_2N_2$ in a solvent such as diethyl ether. This is often preferred, since explosion risks are thus reduced.

Atmospheric pressure is preferred, but pressures in the range 10 mm. to 10 atmospheres can be employed. At pressures greater than 1 atmosphere it is preferred that the nitroso-compound is added to a solution of the diazo-compound in order to minimize explosion hazard. At pressures of less than 1 atmosphere no solvent need be employed.

Reactions are rapid, even at low temperature. Contact times of 0.1 second to 30 minutes suffice.

Reaction in the absence of solvent are also possible e.g. a stream of gaseous diazomethane can be injected into a reservoir containing gaseous nitroso-compound.

Glass or metals, such as stainless steel may be employed for the reaction vessel.

The polymers of this invention are useful fibre-forming and film-forming materials and show good thermal- and corrosion-resistance making them suitable as gasket materials and for protective coatings of various kinds.

Some detailed examples of production of polymers in accordance with the invention will now be given. In all cases the molar ratio of the reactants is 1:1, and the polymeric product gives the correct analysis for $$(-N-O-CH_2-)_n$$
$$\phantom{(-N-O-}|$$
$$\phantom{(-N-O-}CF_3$$

The infra-red spectra of all the forms of the polymer are identical.

Examples of reactions which have been carried out are:

(1) Gaseous trifluoronitrosomethane, $CF_3NO$ (5.45 gms.) at atmospheric pressure was passed during 30 minutes into a solution of 2.1 gms. of diazomethane, $CH_2N_2$, in 200 ml. of diethyl ether at $-78°$ C. until an excess of the nitroso-compound was present as shown by the persistence of a blue colour. On slowly evaporating the solution at $-22°$ C., a translucent wax was deposited. This sublimed at $80°$ C./$10^{-3}$ Hg to give a viscous liquid, whose infra-red spectrum was identical with that of the translucent wax. The yield of the polymer was 5.5 gms. (98% yield based on $CH_2N_2$).

(2) Gaseous $CH_2N_2$ diluted with nitrogen (15 lit./hr.) was passed during 1 hr. into a solution of 5.0 gms. of $CF_3NO$ in 100 ml. of perfluoro-n-pentane, $C_5F_{12}$, at $-96°$ C. As the passage of the gas proceeded, a white elastomer was formed at the point where the $CH_2N_2$ entered the solution. After an excess (2.4 gms.) of the diazo-compound had been added, the polymer (5.5 gms., 98%) was filtered off. Evaporation of the mother liquor did not yield any further product.

The polymer produced in this experiment had a higher molecular weight than that obtained in Example 1. This was due to the use of a lower reaction temperature and of a solvent in which the polymer was insoluble.

(3) Gaseous $CF_3NO$ (6.0 gms.) was passed during a period of 20 minutes into a solution of 2.1 gms. of $CH_2N_2$ in 150 ml. $C_5F_{12}$ at $-96°$ C. A product (5.5 gms., 98%), similar to that in Example 2, was deposited as the reaction proceeded.

(4) Gaseous $CF_3NO$ (11 gms.) was passed during 1 hr. into a solution of 4.2 gms. of $CH_2N_2$ in 150 ml. of diethyl ether at $-96°$ C. As the reaction proceeded, the solution at the bottom of the reaction vessel became more viscous. On slowly evaporating the solution in vacuo at $-78°$ C., and finally at $-22°$ C., a white, opaque, powdery resin was obtained (11.2 gms., 99%). The resin liquefies at 100–120° C., and from the melt it is possible to draw fine threads. A transparent film may be obtained by heating the powder at ca. 120° C. under pressure between polished metal plates.

Here, the use of a more concentrated solution of the diazo-compound and of a lower temperature than in Example 1 led to the formation of a polymer which had a much higher molecular weight.

We claim:
1. Polymers having the repeating structural unit

$$(-NR-O-CH_2-)$$

wherein R represents the group R'R''CX— in which R' and R'' are selected from the group consisting of hydrogen, alkyl, aryl, halogeno-alkyl, halogeno-aryl, nitro-halogeno-alkyl, chlorine, and fluorine and X is selected from the group consisting of chlorine and fluorine.

2. Polymers according to claim 1, in which R represents the trifluoromethyl group.

3. Process for producing polymers according to claim 1, in which diazomethane is reacted with a nitroso-compound of formula RNO where R has the significance specified in claim 1.

4. Process according to claim 3, in which the reaction temperature is in the range from −150° to 150° C.

5. Process according to claim 4, in which the reaction temperature is in the range from −100° to 25° C.

6. Process according to claim 3, in which the reaction is conducted in a solvent for diazomethane.

7. Process according to claim 6, in which the solvent is selected from the group consisting of diethyl ether, perfluoro-n-pentane and $CF_2Cl.CFCl_2$.

References Cited by the Examiner
UNITED STATES PATENTS
2,670,333   2/54   Ray _____ 260—2

OTHER REFERENCES
Barr et al.: Chemical Society Journal, pages 1151–5, March 1960.
Kharkharor: Chemical Abstracts, vol. 52, page 9979 (1958).

MURRAY TILLMAN, *Primary Examiner.*
LOUISE P. QUAST, *Examiner.*